United States Patent [19]

Ross et al.

[11] Patent Number: 4,648,926
[45] Date of Patent: Mar. 10, 1987

[54] ELECTRICALLY-ISOLATING COUPLER SUITABLE FOR HIGH PRESSURE CRYOGENIC GAS FLOW

[75] Inventors: Oakley G. Ross, Upland; Mark L. Kline, Fullerton; Larry D. Wedertz, Mira Loma, all of Calif.

[73] Assignee: General Dynamics Pomona Division, Pomona, Calif.

[21] Appl. No.: 796,258

[22] Filed: Nov. 8, 1985

Related U.S. Application Data

[62] Division of Ser. No. 600,070, Apr. 13, 1984, Pat. No. 4,601,493.

[51] Int. Cl.⁴ .................. F16L 25/02; C03C 27/02
[52] U.S. Cl. .................................... 156/158; 65/59.35; 156/89; 156/294; 156/304.2; 156/304.3; 156/304.5; 156/304.6; 156/325; 174/85; 285/53; 285/334.5
[58] Field of Search ............... 156/158, 304.2, 304.3, 156/304.5, 89, 294, 304.6, 325; 285/41, 53, 334.5, 417, 904, 911; 65/59.25, 59.27, 59.22, 59.35; 174/15 C, 85

[56] References Cited

U.S. PATENT DOCUMENTS

| 2,721,159 | 10/1955 | Johnston | 156/304.5 |
| 2,992,457 | 7/1961 | Harrison | 156/294 |
| 3,261,735 | 7/1966 | Brown | 156/158 |
| 3,276,929 | 10/1966 | Ferch | 156/158 |
| 3,686,747 | 8/1972 | Bagnulo | 285/53 |
| 4,043,854 | 8/1977 | Le Noane et al. | 156/158 |
| 4,398,754 | 8/1983 | Caroleo et al. | 156/294 |

Primary Examiner—Michael Wityshyn
Attorney, Agent, or Firm—Neil F. Martin; Edward B. Johnson

[57] ABSTRACT

A coupler for electrically-isolating two conductive sections of fluid-passing line includes two nonconductively-interconnected pieces of tubing for insertion in the line. The pieces of tubing each have a divergently-flared end, and the flared ends are nonconductively-interconnected within two dielectric wafers. Each wafer has a tapered hole extending through it that matches the flared ends and enlarges to a face on the wafer. The flared ends are each bonded within a separate one of the tapered holes in a position recessed from the face with the flare of the end paralleling the taper of the hole, and the faces are bonded together with the larger ends of the tapered holes aligned and the flared ends sealed in fluid communication with an electrically-nonconductive gap between them.

8 Claims, 6 Drawing Figures

DRILL TAPERED HOLE
IN CERAMIC WAFER

APPLY PASTE TO
CONTACTING FACES

INSERT TUBE AND
FLARE END

CLAMP TOGETHER
AND HEAT JOINT 4,648,926

ELECTRICALLY-ISOLATING COUPLER SUITABLE FOR HIGH PRESSURE CRYOGENIC GAS FLOW

This is a division of application Ser. No. 600,070, filed Apr. 13, 1984, now U.S. Pat. No. 4,601,493.

BACKGROUND OF THE INVENTION

This invention relates in general to electrical insulators, and pertains particularly to a coupler for electrically isolating two conductive sections of fluid-passing line.

Electrically-isolating couplers for insertion in fluid-passing lines exist in the prior art. Present day technology requirements place severe design constraints on such couplers, however, that were not present nor provided for in the past.

For example, an infrared detector, such as may be used as part of an infrared seeker or scanner in helicopters or air-to-ground missiles must be cool in order to develop maximum sensitivity. Metal tubing is often used to deliver a cooling gas to the detector, and since the tubing may couple stray electrical signals to the detector and cause it to malfunction, an electrically-isolating coupler is desired. Inserted an electrically-isolating coupler in the metal tubing line decreases coupling of stray signals and the probability of detector malfunctioning.

The high pressure of up to 7,200 psi and low temperatures in the range of minus 423° F. that characterize the cooling gas employed, make existing couplers inadequate for this purpose.

Therefore, it is desirable to have a coupler for electrically isolating two conductive sections of fluid-passing line, and it is desirable that the coupler be suitable for high pressure cryogenic gas flow. It is desirable that the coupler be relatively small and lightweight, and it would be convenient if the coupler could be easily inserted in an existing fluid-passing line.

SUMMARY OF THE INVENTION

This invention provides a new and improved electrically-isolating coupler suitable for high pressure cryogenic gas flow.

The coupler includes two nonconductively-interconnected pieces of tubing for insertion between two conductive sections of fluid-passing line to be electrically isolated. Each piece of tubing has a divergently-flared end, and the flared ends are nonconductively-interconnected within two dielectric wafers. Each wafer has a tapered hole extending through it that matches the flared ends and enlarges to a face on the wafer. The flared ends are each bonded within a separate one of the tapered holes in a position recessed from the face, and the faces are bonded together with the larger ends of the tapered holes aligned and the flared ends sealed in fluid communication with an electrically-nonconductive gap between them.

The above and other attendant objects and advantages of the invention will become apparent from the detailed description when read in conjunction with the drawing wherein:

DETAILED DESCRIPTION OF THE INVENTION

Figure 1:
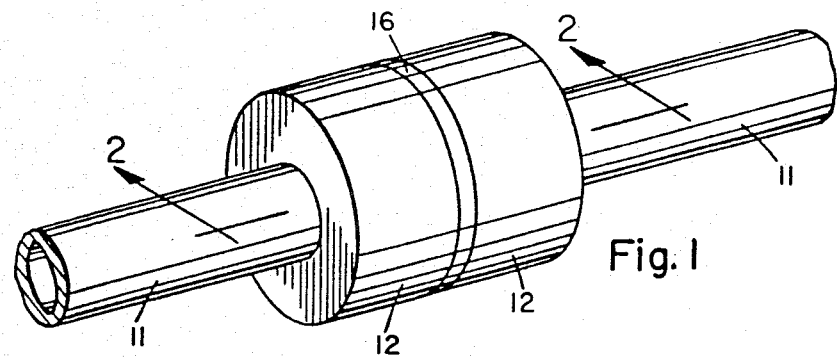
FIG. 1 is a perspective view of an exemplary embodiment of a coupler constructed in accordance with the invention.

An electrically-isolating coupler constructed in accordance with the invention is illustrated in FIG. 1. The coupler includes two pieces of tubing 11 that are bonded within two dielectric wafers 12. The wafers are bonded together to nonconductively-interconnect the pieces of tubing. The resulting coupler can be inserted between two conductive sections of fluid-passing line that require electrical isolation to provide a lightweight joint suitable for a high pressure cryogenic gas flow.

Figure 2:
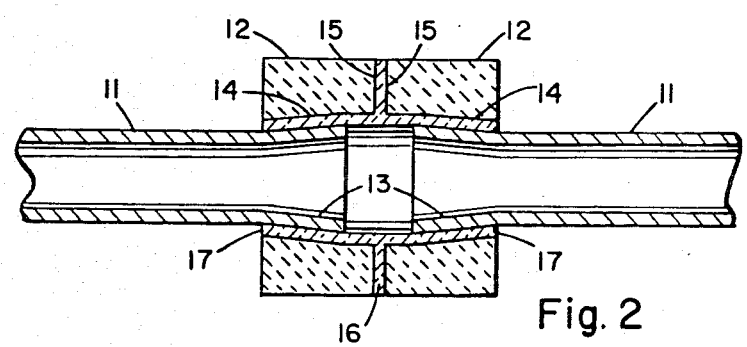
FIG. 2 is a sectional view taken on line 2—2 of FIG. 1.

Further details of the coupler are illustrated in FIG. 2. Each piece of tubing 11 of the illustrated embodiment is a length of metallic coolant tubing suitable for insertion between two conductive sections of fluid-passing line to be electrically isolated. The tubing can be of any convenient length sufficient to allow the coupler to be inserted in the line. Each piece of tubing 11 in the illustrated embodiment is composed of stainless steel alloy of approximately 0.06 inch outside diameter for insertion between two conductive sections of line passing a cryogenic gas flow.

Each piece of tubing 11 has a divergently-flared end 13. The flare of the end is approximately five degrees with respect to the longitudinal axis of the tube. As illustrated in FIG. 2, the outside diameter of each tube enlarges toward the flared end.

The end that is opposite the flared end of the piece of tubing may be adapted for connection to one of the two conductive sections of fluid-passing line to be electrically isolated. It may be connected with an appropriate connector such as a standard flared nut. The manner of connection is not critical to the principles of the invention, and the full length of pieces of tubing 11 is not shown for convenience of illustration.

FIG. 2 illustrates the details of the two dielectric wafers 12. Each wafer has a tapered hole 14 extending through it. The tapered holes match the flared ends so that the outer surface of each flared end 13 generally parallels the inner surface of each tapered hole 14. Accordingly, each tapered hole of the illustrated embodiment has a taper of approximately five degrees with respect to the longitudinal axis of the hole.

Each wafer 12 has a corresponding face 15 to which the larger end of the tapered hole extends, so that the wafers can be positioned face-to-face with the larger ends of the tapered holes aligned as illustrated in FIG. 2.

The wafers of the invention are composed of a dielectric material. A ceramic material is used in the illustrated embodiment, and the ceramic material is thermally matched to the pieces of tubing. It is thermally matched in the sensed that the coefficients of expansion of the wafers and the pieces of tubing are matched, thereby avoiding damage to the joint when the coupler temperature is lowered to the temperature of a cryogenic gas flow.

Aluminum oxide is employed for the illustrated wafers. It has strength and high dielectric characteristics, it is generally accessible, and its coefficient of expansion sufficiently matches that of the stainless steel alloy of which the pieces of tubing are composed.

The aluminum oxide wafers in the illustrated embodiment have the form of a disc approximately one-half inch in diameter and approximately 0.15 inch thick, to provide a strong, lightweight coupler of small size that can withstand high pressures and low temperatures.

The flared ends 13 are each bonded to a wafer 12 within a separate one of the tapered holes 14. As illustrated in FIG. 2, the flare of the end extends slightly less than the thickness of the wafer so that the flared end can be bonded within the tapered hole in a position recessed from the corresponding face 15 with the flare of the end paralleling the taper of the hole.

Faces 15 are also bonded together. They are bonded together so that the larger ends of the tapered holes are aligned. The resulting assembly results in the flared ends being sealed in fluid communication with an electrically-nonconductive gap between them (FIG. 2).

A suitable bonding agent is employed for bonding the assembly together. The same bonding agent is used throughout. In FIG. 2, bonding agent 16 designates the bond between faces 15, and bonding agent 17 within tapered holes 14 designates the bond between flared ends 13 and wafers 12.

The bonding agent employed in the illustrated embodiment is a glass frit paste. It is characterized by a melting point relatively low in comparison to the extremely high melting point of the ceramic wafers. It is also characterized by a coefficient of expansion which sufficiently matches that of the aluminum oxide wafers and that of the stainless steel alloy pieces of tubing to prevent damage to the assembly when the coupler is lowered to the temperature of a cryogenic gas flow.

Suitable glass frit pastes for use in bonding various dielectric materials are well known in the art. They employ principally a paste-like substance in which is dispersed finely ground glass. The paste serves as a vehicle for application of the ground glass. As the paste is raised sufficiently in temperature, the glass melts to form a bond; the paste vaporizes.

Figure 3:
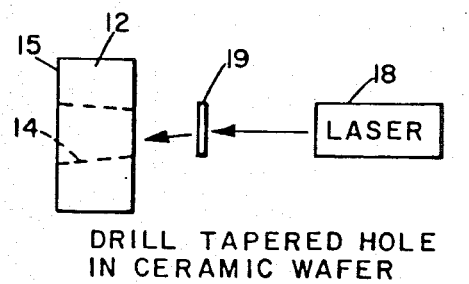
FIGS. 3-6 illustrate diagrammatically the consecutive steps of making the coupler.

FIGS. 3-6 illustrate diagrammatically the consecutive steps of making the illustrated coupler. In FIG. 3, laser 18 and lens 19 illustrate laser machining of taper hole 14 in wafer 12. The larger end of the tapered hole is shown extending to face 15 on the wafer. Accordingly, a separate tapered hole is drilled through each of two dielectric wafers with the larger end of the tapered hole extending to a corresponding face on the wafer. Drilling with a diamond drill, followed by lapping and grinding, is a suitable substitute for laser machining.

Figure 4:
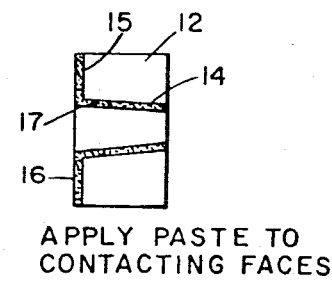

FIG. 4 illustrates the application of the bonding agent to each of the wafers 12. Accordingly, bonding agent 16 is spread on faces 15, and bonding agent 17 is spread within the tapered hole 14. A bonding agent as described above is employed.

Figure 5:
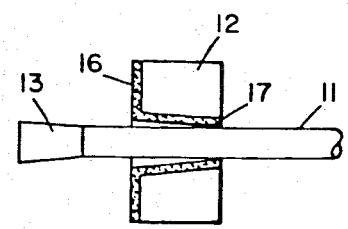

FIG. 5 illustrates inserting and flaring the tubing ends. Accordingly, an end of each piece of tubing 11 is inserted through a separate one of the tapered holes to extend out of the larger end past face 15. The end of the piece of tubing that is inserted through the tapered hole is then divergently flared to form flared end 13 as illustrated.

Figure 6:
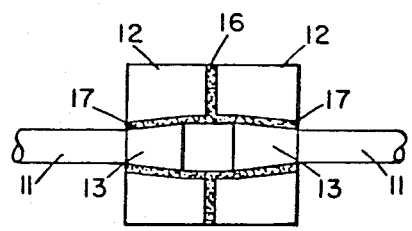

FIG. 6 illustrates the final assembly of the coupler. Accordingly, each piece of tubing 11 is positioned so that the flared end is recessed from the corresponding face with the flare of the end paralleling the taper of the hole. Faces 15 of wafers 12 are positioned face-to-face and bonded together by bonding agent 16 as illustrated. The larger ends of the tapered holes are aligned with the flared ends sealed in fluid communication with an electrically-nonconductive gap between them.

The coupler so formed can be inserted between two conductive sections of fluid-passing line to electrically isolate them from one another. The nonconductive gap illustrated is approximately 0.04 inch, sufficient to decouple low level stray signals that might otherwise cause malfunctions.

The invention includes a unique interaction of components to provide a joint suitable for high pressure cryogenic gas flow. Bonding agent 17, within tapered holes 14 between flared ends 13 and wafers 12, bonds the respective flared ends in place with an electrically-nonconductive gap between them (FIG. 2). The pressure of gas passing through pieces of tubing 11 creates a force directed along their longitudinal axes that tends to force the pieces of tubing apart and out of the tapered holes. However, the taper of the hole and the flare of the end combine to counter that force. Pressure tending to force the pieces of tubing apart tends to compress bonding agent 17 by virtue of the tapered hole and flared end combination. The compressive force on bonding agent 17 overrides shearing forces between the pieces of tubing and bonding agent 17 to securely retain the pieces of tubing in place.

The foregoing features of the invention permit a coupler to be constructed of small size and low mass without the need for associated brackets, tie-down, or other supporting hardware, so that the coupler is particularly advantageous for use with flight hardware.

The foregoing is a complete description of a coupler constructed in accordance with the invention. While the invention has been illustrated and described by means of a specific embodiment and exemplary procedures, it is to be understood that numerous changes and modifications may be made without departing from the spirit and scope of the invention as defined in the appended claims.

What is claimed is:

1. A method of nonconductively interconnecting two conductive pieces of tubing, which comprises:
    drilling a separate tapered hole through each of two dielectric wafers with the larger end of the tapered hole extending to a corresponding face on the wafers;
    spreading a bonding agent on the wafers, both on the faces and within the tapered holes;
    inserting an end of each piece of tubing through a separate one of the tapered holes to extend out of the larger end, including divergently flaring and positioning the tubing end recessed from the corresponding face with the flare of the tubing end paralleling the taper of the hole; and
    bonding the wafer faces together with the larger ends of the tapered holes aligned and the flared tubing ends sealed in fluid communication with an electrically-nonconductive gap between them.

2. The method recited in claim 1 which includes using wafers composed of ceramic material.

3. The method recited in claim 2 which includes using wafers composed of aluminum oxide.

4. The method recited in claim 1 which includes drilling each tapered hole with a taper of substantially five degrees.

5. The method recited in claim 1 which includes using wafers composed of a material having a coefficient of expansion matched to that of the two pieces of tubing to prevent damage to the bond when a cryogenic gas flow is passed through the pieces of tubing.

6. The method recited claim in 1 which includes divergently flaring the end to an outside diameter larger than the inside diameter of the smaller end of each tapered hole.

7. The method recited in claim 1 which includes using a glass frit paste bonding agent.

8. A method of nonconductively interconnecting two conductive pieces of tubing with a joint suitable for a cryogenic gas flow, which comprises:

drilling a separate tapered hole through each of two dielectric wafers composed of aluminum oxide with the larger end of each tapered hole extending with a taper of substantially five degrees to a larger end on a corresponding face of the wafers;

spreading a glass frit paste bonding agent on the wafers, both on the faces and within the tapered holes;

inserting an end of each piece of tubing through a separate one of the tapered holes to extend out of the larger end, including divergently flaring and positioning the tubing end recessed from the face with the flare of the tubing end paralleling the taper of the hole; and bonding the wafer faces together with the larger ends of the tapered holes aligned and the flared tubing ends sealed in fluid communication with an electrically-nonconductive gap between them.

* * * * *